W. L. PARMELEE.
Machine for Making Checkers and Buttons.

No. 218,640. Patented Aug. 19, 1879.

WITNESSES
Nat. E. Oliphant
Geo. R. Porter

INVENTOR
W. L. Parmelee.
per
Chas. H. Fowler.
Atty.

UNITED STATES PATENT OFFICE.

WELLINGTON L. PARMELEE, OF KILLINGWORTH, CONNECTICUT.

IMPROVEMENT IN MACHINES FOR MAKING CHECKERS AND BUTTONS.

Specification forming part of Letters Patent No. 218,640, dated August 19, 1879; application filed June 30, 1879.

*To all whom it may concern:*

Be it known that I, WELLINGTON L. PARMELEE, of Killingworth, in the county of Middlesex and State of Connecticut, have invented a new and valuable Improvement in Machines for Making Checkers and Buttons; and I do hereby declare that the following is a full, clear, and exact description of the construction and operation of the same, reference being had to the annexed drawings, making a part of this specification, and to the letters and figures of reference marked thereon.

Figure 1:
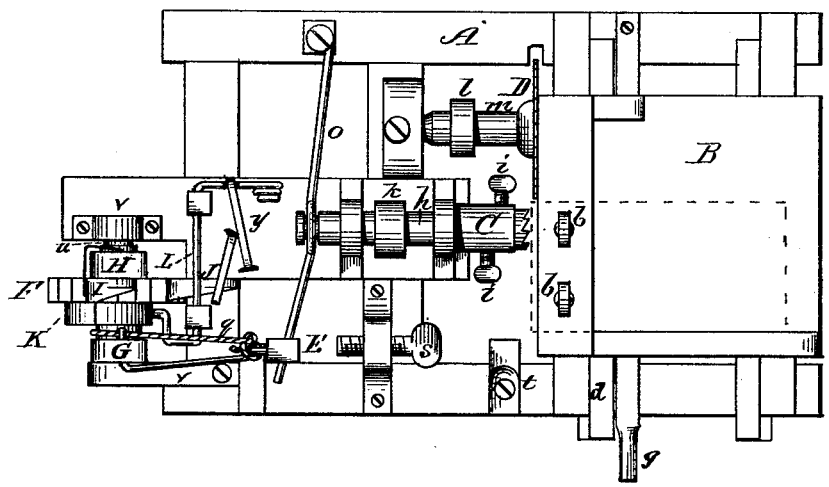
Figure 2:
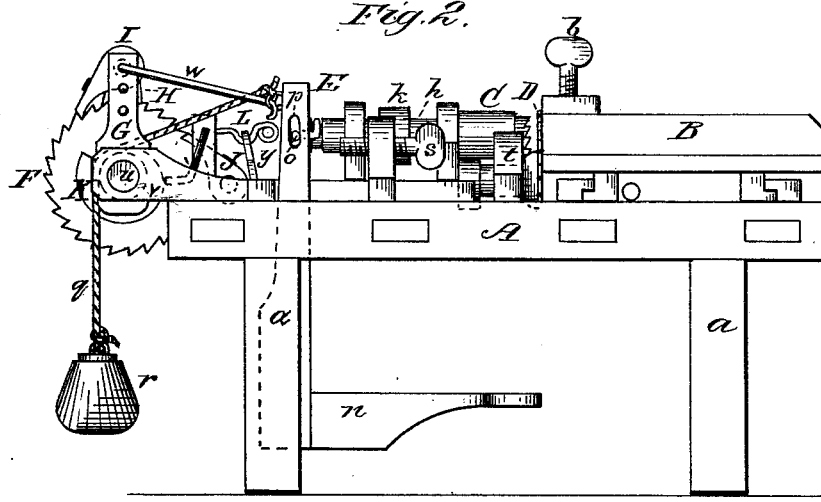
Figure 3:
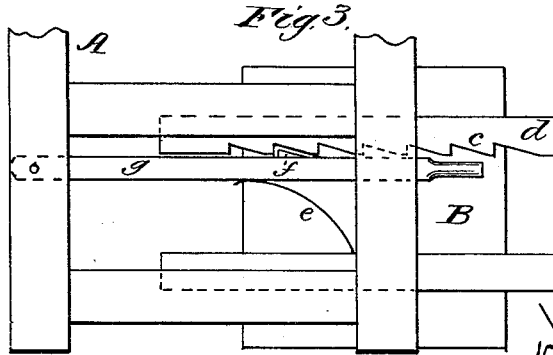
Figure 4:
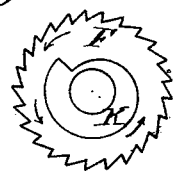

Figure 1 of the drawings is a representation of a top-plan view of my invention. Fig. 2 is a side elevation of the same. Fig. 3 is an under-side view of the sliding table and a portion of the frame of the machine, and Fig. 4 is a top-plan view or side elevation of the ratchet-wheel with cam attached.

This invention has relation to machines used for the purpose of cutting regular forms from wood, such as buttons, checkers, and all circular-formed articles; and the invention consists in the general construction and arrangement of the several parts constituting the machine, hereinafter described, and subsequently pointed out in the claims.

In the accompanying drawings, A represents the frame or support of the machine, of any suitable form, elevated a sufficient distance from the floor for convenience of the operator by legs $a$. The frame A at one end has a transverse sliding table, B, upon which the blank is placed, and held by set-screws $b$. This table B, with the block or blank from which the checkers are cut, is moved along as the cutting of each checker is completed, the length of the teeth $c$ upon the bar $d$ equaling the diameter of the checker. As the table is moved the distance required for cutting the succeeding checker, the spring $e$ forces the lever against the bar $d$, and the tooth $f$ upon said bar is caused to engage with the teeth at each cutting of a checker from the blank.

When it is desired to place the table at its starting-point, the lever $g$ is drawn back to disengage the tooth $f$, or, in other words, the pawl is disengaged with the teeth upon the bar, which admits of the table being pushed back in position to again start. The cylindrical saw C is connected to a rotary shaft, $h$, by set-screws $i$, so that it may be adjustable thereon to change its length with relation to the edge of the table B.

The saw C both stamps and beads the checkers, the saw being given a rotary motion by a suitable belt over a pulley, $k$, upon the shaft $h$. As the checker is cut out from the block or blank it is cut off from the same by a circular saw, D, kept in motion by a suitable belt over a pulley, $l$, secured to the shaft $m$, which carries the saw. The cylindrical saw C is pressed against the edge of the block or blank while cutting out and beading the checker by a vertical lever, E, provided with a suitable foot-treadle, $n$.

A rod, $o$, pivoted to the frame A, is connected to the rear end of the shaft $h$, the free end of the rod passing through an elongated slot, $p$, in the upper end of the lever E. By pressing on the treadle $n$, the lever E, which is pivoted to one of the legs $a$ of the frame A, is forced forward at its upper end, which carries with it the rod $o$, which, in turn, forces forward the shaft $h$ with the saw C. When the pressure upon the treadle is removed the cord $q$ and weight $r$ draw back the lever to a vertical position.

The forward motion of the saw C is regulated by a set-screw, $s$, which regulates the distance of the lever E in its forward motion, whereby the depth of the cutting is gaged according to the thickness of the checkers required.

The position of the block or blank, as represented in dotted lines, Fig. 1 of the drawings, is regulated by the gage $t$.

To the end of the frame A, opposite the table B, is a large ratchet-wheel, F, loosely hung upon a horizontal shaft, $u$, having its bearings in frames $v$. Rigidly connected to the shaft $u$ are arms G H, the arm G being connected to the lever E by a rod, $w$, and the arm H carrying a spring-pawl, I, a second spring-pawl, J, being connected to the frame A below the axis of the ratchet-wheel F. The ratchet-wheel has a cam, K, rigidly connected to one of its sides, which has bearing against its periphery an alarm-rod, L. This rod may have at one of its ends a bell, or a bell may be connected to the frame A, and the end of the rod provided with a hammer for striking the bell;

or any other suitable alarm may be employed in connection with the rod.

As the treadle n is pressed upon and the upper end of the lever E forced forward, the arms G H are also, by the rod w, caused to be brought forward, the pawl I passing over one tooth upon the ratchet-wheel F, while the pawl J prevents the wheel from slipping around. As the pressure is removed from the treadle n, which is done after the completion of the cutting of the checker, the wheel, by the pawl I, will be caused to move upon its axis the distance equal to the length of one of the teeth. This operation is repeated until the wheel F makes a complete revolution. When that part of the cam K farthest from the center of axis of the wheel F passes the bearing point or end of the rod the latter falls or is forced down by a spring, y, giving the required alarm at each complete revolution of the wheel F, and by the number of teeth upon the wheel it is known exactly the number of checkers cut from the block or blank and beaded upon one side, when they may be removed to a second machine and similarly finished upon the opposite side.

The machine may be operated by any suitable power, and may be employed by changing the form of the cutter or saw C for manufacturing buttons and button-molds, also cutting out and boring wooden inkstand-blocks.

Having now fully described my invention, what I claim as new, and desire to secure by Letters Patent, is—

1. The ratchet-wheel F, pawls I J, and cam K, in combination with the alarm-rod L and saw C, substantially as and for the purpose set forth.

2. The lever E, saws C D, and adjustable table B, in combination with the ratchet-wheel F, cam K, spring-pawls I J, and alarm-rod L, constructed to operate substantially as and for the purpose specified.

In testimony that I claim the above I have hereunto subscribed my name in the presence of two witnesses.

WELLINGTON L. PARMELEE.

Witnesses:
   ORLANDO E. REDFIELD,
   ELIZA G. REDFIELD.